US011307410B2

(12) United States Patent
Strandborg et al.

(10) Patent No.: US 11,307,410 B2
(45) Date of Patent: Apr. 19, 2022

(54) DISPLAY APPARATUS AND METHOD INCORPORATING ADAPTIVE POSE LOCKING

(71) Applicant: Varjo Technologies Oy, Helsinki (FI)

(72) Inventors: Mikko Strandborg, Hangonkylä (FI); Ville Miettinen, Helsinki (FI); Klaus Melakari, Espoo (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 17/155,621

(22) Filed: Jan. 22, 2021

(65) Prior Publication Data

US 2021/0247607 A1 Aug. 12, 2021

Related U.S. Application Data

(63) Continuation-in-part of application No. 16/783,557, filed on Feb. 6, 2020, now Pat. No. 11,056,030.

(51) Int. Cl.
*G09G 5/00* (2006.01)
*G09G 5/10* (2006.01)
(Continued)

(52) U.S. Cl.
CPC ..... *G02B 27/0093* (2013.01); *G02B 27/0179* (2013.01); *G06F 3/013* (2013.01);
(Continued)

(58) Field of Classification Search
CPC ........ G02B 2027/0138; G02B 27/0172; G06F 3/013
See application file for complete search history.

(56) References Cited

U.S. PATENT DOCUMENTS 5,742,264 A    4/1998   Inagaki et al.
6,456,340 B1 *   9/2002   Margulis .................. G06T 1/20
                                                     345/501

(Continued)

FOREIGN PATENT DOCUMENTS

WO     2013171168 A1    11/2013

OTHER PUBLICATIONS

PCT, Notification of Transmittal of The International Search Report and The Written Opinion of The International Searching Authority, or The Declaration, Application No. PCT/FI2021/050085, dated Jun. 14, 2021, 29 pages.
(Continued)

*Primary Examiner* — Nan-Ying Yang
(74) *Attorney, Agent, or Firm* — Ziegler IP Law Group, LLC

(57) ABSTRACT

A display apparatus including pose-tracking means; image renderer per eye; liquid-crystal device including liquid-crystal structure and control circuit; and processor. Processor is configured to: process pose-tracking data to determine user's head pose; detect if rate at which head pose is changing is below predefined threshold rate; if yes, switch on lock mode, select head pose for session of lock mode, and generate output image frames according to head pose during session; if no, generate output image frames according to corresponding head poses of user using pose-tracking data; and display output image frames, whilst shifting light emanating to from pixels of image renderer to multiple positions (P1-P9) in sequential and repeated manner, said shifting causes resolution of output image frames to appear higher than display resolution of image renderer.

16 Claims, 4 Drawing Sheets

(51) Int. Cl.
    *G09G 5/02*      (2006.01)
    *G02B 27/00*      (2006.01)
    *G06T 7/70*      (2017.01)
    *G02B 27/01*      (2006.01)
    *G06F 3/01*      (2006.01)

(52) U.S. Cl.
    CPC .......... *G06T 7/70* (2017.01); *G02B 2027/014* (2013.01); *G02B 2027/0147* (2013.01); *G02B 2027/0187* (2013.01)

(56) References Cited

U.S. PATENT DOCUMENTS

| | | | |
|---|---|---|---|
| 9,710,887 B1 | 7/2017 | Sahlsten et al. | |
| 2002/0008812 A1* | 1/2002 | Conner | G02B 27/1066 349/106 |
| 2015/0149956 A1* | 5/2015 | Kempinski | G06F 3/013 715/784 |
| 2017/0270637 A1 | 9/2017 | Perreault et al. | |
| 2018/0053284 A1 | 2/2018 | Rodriguez et al. | |
| 2018/0075820 A1 | 3/2018 | Hicks et al. | |
| 2018/0136471 A1* | 5/2018 | Miller | G02B 27/0093 |
| 2019/0243134 A1 | 8/2019 | Perreault et al. | |
| 2019/0318677 A1 | 10/2019 | Lu et al. | |
| 2019/0354173 A1 | 11/2019 | Young et al. | |

OTHER PUBLICATIONS

International Search Report and Written Opinion of the International Searching Authority, Application No. PCT/FI2021/050082, dated Apr. 23, 2021, 19 pages.

Notification of Transmittal of The International Search Report and The Written Opinion of The International Searching Authority, or The Declaration, Application No. PCT/FI2020/050073, dated Apr. 30, 2021, 17 pages.

* cited by examiner

DISPLAY APPARATUS AND METHOD INCORPORATING ADAPTIVE POSE LOCKING

CROSS-REFERENCE TO RELATED APPLICATIONS

This application is a continuation-in-part of U.S. patent application Ser. No. 16/783,557, titled "DISPLAY APPARATUS AND METHOD OF ENHANCING APPARENT RESOLUTION USING LIQUID-CRYSTAL DEVICE" and filed on Feb. 6, 2020, which is incorporated herein by reference.

TECHNICAL FIELD

The present disclosure relates to display apparatuses incorporating adaptive pose locking. Moreover, the present disclosure also relates to methods of displaying via display apparatuses incorporating adaptive pose locking.

BACKGROUND

Presently, several extended-reality (XR) technologies (for example, such as virtual reality (VR), augmented reality (AR), mixed reality (MR), and the like) are being used to present interactive XR environments to users. Typically, the users utilize XR devices (for example, such as an XR headset, a pair of XR glasses, and the like) for experiencing and interacting with such XR environments. In use, the user generally wears an XR device on his/her head.

Conventional XR devices employ various equipment and techniques to generate and display images that constitute the XR environment. Some XR devices employ pixel-shifting technology wherein light emanating from a given pixel of an image renderer (for example, such as a display, a projector, and the like) is shifted to multiple positions for providing an apparent spatial super-resolution.

However, provision of high spatial resolutions for the images using the pixel-shifting technology has certain problems associated therewith. These problems can be attributed to movement of the user's head while viewing the XR environment. As an example, a rendering application that generates the images is required to generate a full resolution image data for each image, wherein this full resolution image data includes pixel values corresponding to each of the multiple positions for every pixel of a given image. This requirement is due to the fact that when the user's head is moving, the rendering application is unable to ascertain exactly where each pixel that it generates would be shown on the image renderer. Moreover, as there is always some latency between measurement of a pose of the user's head and generation of an image corresponding to said pose, it is possible that the pose of the user's head might have changed by the time the generated image is ready for displaying. In such a case, a compositor re-projects the image to match a latest head pose prior to displaying. However, even minor head movements cause the generated image to shift around by several pixels, making it quite hard for a viewer to clearly see small details (such as fine-printed text, patterns, and the like) in the XR environment (as re-projected pixels of consecutive images would keep shifting rapidly and keep overlapping with each other).

Therefore, in light of the foregoing discussion, there exists a need to overcome the aforementioned drawbacks associated with provision of high-resolution images in specialized devices.

SUMMARY

The present disclosure seeks to provide a display apparatus incorporating adaptive pose locking. The present disclosure also seeks to provide a method of displaying, via a display apparatus incorporating adaptive pose locking. An aim of the present disclosure is to provide a solution that overcomes at least partially the problems encountered in prior art.

In one aspect, an embodiment of the present disclosure provides a display apparatus comprising:
  pose-tracking means;
  an image renderer per eye;
  a liquid-crystal device comprising a liquid-crystal structure and a control circuit, wherein the liquid-crystal structure is arranged in front of an image-rendering surface of the image renderer; and
    at least one processor configured to:
    process pose-tracking data, collected by the pose-tracking means, to determine a head pose of a user;
    detect whether or not a rate at which the head pose of the user is changing is below a predefined threshold rate;
    when it is detected that the rate is below the predefined threshold rate, switch on a lock mode of the display apparatus, select a given head pose of the user for a given session of the lock mode, and generate a sequence of output image frames according to the given head pose during the given session of the lock mode;
    when it is detected that the rate is not below the predefined threshold rate, generate the sequence of output image frames according to corresponding head poses of the user as determined from the pose-tracking data; and
    display the sequence of output image frames via the image renderer, whilst controlling the liquid-crystal structure, via the control circuit, to shift light emanating from a given pixel of the image renderer to a plurality of positions in a sequential and repeated manner, wherein a shift in the light emanating from the given pixel of the image renderer to the plurality of positions causes a resolution of the output image frames to appear higher than a display resolution of the image renderer.

In another aspect, an embodiment of the present disclosure provides a method of displaying via a display apparatus comprising pose-tracking means, an image renderer per eye, and a liquid-crystal device comprising a liquid-crystal structure and a control circuit, wherein the liquid-crystal structure is arranged in front of an image-rendering surface of the image renderer, the method comprising:
  processing pose-tracking data, collected by the pose-tracking means, to determine a head pose of a user;
  detecting whether or not a rate at which the head pose of the user is changing is below a predefined threshold rate;
  when it is detected that the rate is below the predefined threshold rate, switching on a lock mode of the display apparatus, selecting a given head pose of the user for a given session of the lock mode, and generating a sequence of output image frames according to the given head pose during the given session of the lock mode;
  when it is detected that the rate is not below the predefined threshold rate, generating the sequence of output image frames according to corresponding head poses of the user as determined from the pose-tracking data; and
  displaying the sequence of output image frames via the image renderer, whilst controlling the liquid-crystal structure, via the control circuit, to shift light emanating from a given pixel of the image renderer to a plurality of positions in a sequential and repeated manner, wherein a shift in the light emanating from the given pixel of the image renderer to the plurality of positions causes a resolution of the output image frames to appear higher than a display resolution of the image renderer.

Embodiments of the present disclosure substantially eliminate or at least partially address the aforementioned problems in the prior art, and enable presentation of high-quality visual scenes that are generated according to adaptive head pose locking, via the display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
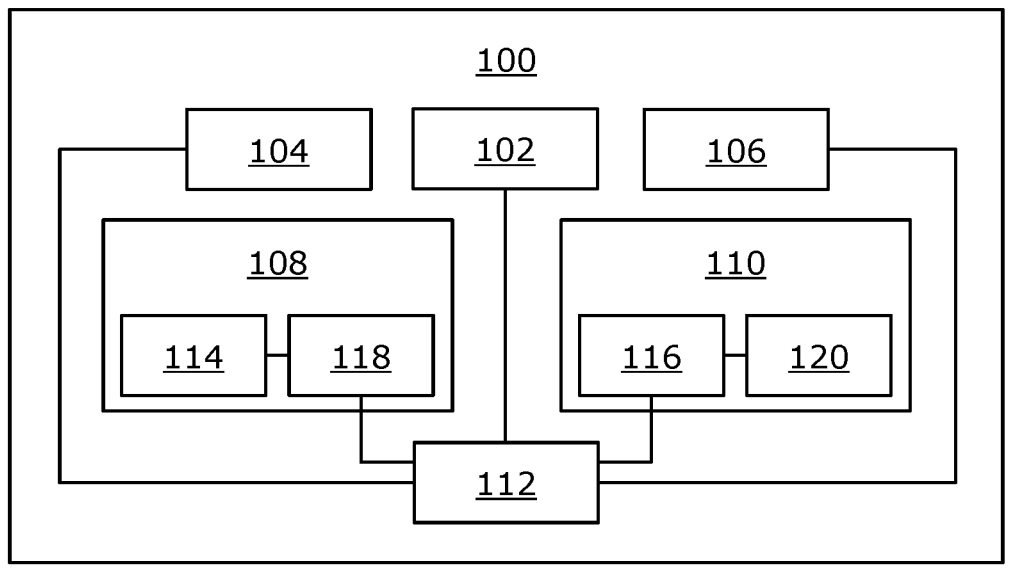
FIGS. 1 and 2 illustrate block diagrams of architectures of a display apparatus, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:
 pose-tracking means;
 an image renderer per eye;
 a liquid-crystal device comprising a liquid-crystal structure and a control circuit, wherein the liquid-crystal structure is arranged in front of an image-rendering surface of the image renderer; and
 at least one processor configured to:
   process pose-tracking data, collected by the pose-tracking means, to determine a head pose of a user;
   detect whether or not a rate at which the head pose of the user is changing is below a predefined threshold rate;
   when it is detected that the rate is below the predefined threshold rate, switch on a lock mode of the display apparatus, select a given head pose of the user for a given session of the lock mode, and generate a sequence of output image frames according to the given head pose during the given session of the lock mode;
   when it is detected that the rate is not below the predefined threshold rate, generate the sequence of output image frames according to corresponding head poses of the user as determined from the pose-tracking data; and
   display the sequence of output image frames via the image renderer, whilst controlling the liquid-crystal structure, via the control circuit, to shift light emanating from a given pixel of the image renderer to a plurality of positions in a sequential and repeated manner, wherein a shift in the light emanating from the given pixel of the image renderer to the plurality of positions causes a resolution of the output image frames to appear higher than a display resolution of the image renderer.

In another aspect, an embodiment of the present disclosure provides a method of displaying via a display apparatus comprising pose-tracking means, an image renderer per eye, and a liquid-crystal device comprising a liquid-crystal structure and a control circuit, wherein the liquid-crystal structure is arranged in front of an image-rendering surface of the image renderer, the method comprising:
 processing pose-tracking data, collected by the pose-tracking means, to determine a head pose of a user;
 detecting whether or not a rate at which the head pose of the user is changing is below a predefined threshold rate;
 when it is detected that the rate is below the predefined threshold rate, switching on a lock mode of the display apparatus, selecting a given head pose of the user for a given session of the lock mode, and generating a sequence of output image frames according to the given head pose during the given session of the lock mode;
 when it is detected that the rate is not below the predefined threshold rate, generating the sequence of output image frames according to corresponding head poses of the user as determined from the pose-tracking data; and
 displaying the sequence of output image frames via the image renderer, whilst controlling the liquid-crystal structure, via the control circuit, to shift light emanating from a given pixel of the image renderer to a plurality of positions in a sequential and repeated manner, wherein a shift in the light emanating from the given pixel of the image renderer to the plurality of positions causes a resolution of the output image frames to appear higher than a display resolution of the image renderer.

The present disclosure provides the aforementioned display apparatus and the aforementioned method of displaying. Beneficially, the rate at which the head pose of the user is changing is compared with the predefined threshold rate, to selectively switch on the lock mode of the display apparatus. When the lock mode is switched on, the sequence of output image frames are generated using the given head pose in a manner that no re-projection is required for their displaying. Only when the lock mode is not switched on, the sequence of output image frames are generated using the given head pose in a manner that re-projection is required for their displaying. The display apparatus employs adaptive pose locking, based on the rate at which the head pose of the user is changing. Employing the lock mode eases a processing burden of reprojection on the at least one processor, and also ensures that in case of only minor head movements, the user is still able to see fine details in a visual scene very clearly. Moreover, the display apparatus and the method employ pixel-shifting technology to shift the light emanating from the given pixel of the image renderer to the plurality of positions for providing an apparent spatial super-resolution that is higher than the display resolution of the image renderer.

Throughout the present disclosure, the term "display apparatus" refers to a display system that is configured to present an extended-reality (XR) environment to the user when the display apparatus in operation is used by the user. Herein, the term "extended-reality" encompasses virtual reality (VR), augmented reality (AR), mixed reality (MR), and the like.

In one implementation, the display apparatus is implemented as pose-tracking means, a head-mounted device (HMD), and a computer coupled to the HMD. In one case, the HMD comprises at least the image renderer per eye and the liquid-crystal device, while the computer comprises the at least one processor. Therefore, computational tasks pertaining to presentation of the XR environment are entirely performed at the computer, by the at least one processor. In another case, the HMD comprises at least the image renderer per eye, the liquid-crystal device, and the at least one processor is implemented at both the HMD and the computer. Therefore, computational tasks pertaining to presentation of the XR environment are performed in a shared manner at both the HMD and the computer, by the at least one processor. The computer may be coupled to the HMD wirelessly and/or in a wired manner. Examples of the computer include, but are not limited to, a desktop computer, a laptop computer, a tablet computer, a workstation, and an XR console.

In another implementation, the display apparatus is implemented as an HMD. In such a case, the HMD comprises at least the image renderer per eye, the liquid-crystal device, and the at least one processor. Therefore, computational tasks pertaining to presentation of the XR environment are entirely performed at the HMD, by the at least one processor.

It will be appreciated that the HMD is worn by the user on his/her head. The HMD is implemented, for example, as an XR headset, a pair of XR glasses, and the like, that is operable to display a visual scene of the XR environment to the user.

Throughout the present disclosure, the term "pose-tracking means" refers to specialized equipment that is employed to detect and/or follow a head pose of the user within a real-world environment. Moreover, the term "pose" encompasses both position and orientation. Furthermore, the term "real-world environment" refers to a physical environment in which the user is present. In practice, the pose-tracking means is actually employed to track a pose of the HMD; the head pose of the user corresponds to the pose of the HMD as the HMD is worn by the user on his/her head. Pursuant to embodiments of the present disclosure, the pose-tracking means is implemented as a true six Degrees of Freedom (6DoF) tracking system. In other words, the pose-tracking means tracks both the position and the orientation of the user's head within a three-dimensional (3D) space of the real-world environment. In particular, said pose-tracking means is configured to track translational movements (namely, surge, heave and sway movements) and rotational movements (namely, roll, pitch and yaw movements) of the user's head within the 3D space.

The pose-tracking means could be implemented as an internal component of the HMD, as a tracking system external to the HMD, or as a combination thereof. The pose-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible light camera, an RFID reader.

In an example, the pose-tracking means may be implemented as Valve Corporation's SteamVR® tracking, where active lighthouses (namely, detectable objects) sending infrared signals are installed at fixed locations in the real-world environment in which the display apparatus is being used. In such a case, the display apparatus comprises detectors that detect these infrared signals and determine the head pose (namely, head position and head orientation) of the user relative to the fixed locations of the lighthouses. In another example, the pose-tracking means may be implemented as a magnetic tracking system (for example, such as magnetic tracking from Polhemus), where an active magnetic field is generated using a transmitter in the real-world environment, and at least one receiver that is capable of sensing the magnetic field is installed into the display apparatus. In yet another example, the pose-tracking means may be implemented as an optical outside-in tracking technique (for example, such as OptiTrack™ and ART tracking), where the display apparatus is fitted with IR retroreflective markers or IR LEDs, and at least one IR camera is installed in the real-world environment to capture IR light reflected from the markers or emitted by the IR LEDs.

Throughout the present disclosure, the term "image renderer" refers to equipment that, in operation, renders (i.e. displays and/or projects) output image frames that are to be shown to the user of the display apparatus. The "image rendering surface" of the image renderer refers to a surface of the image renderer from which light of the rendered output image frames emanates.

Optionally, a given image renderer is implemented as a display. In this regard, a given output image frame is displayed at the given image renderer. Examples of the display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Optionally, a given image renderer is implemented as a projector. In this regard, a given output image frame is projected onto a projection screen or directly onto a retina of the user's eyes. Examples of the projector include, but are not limited to, an LCD-based projector, an LED-based projector, an OLED-based projector, an LCoS-based projector, a Digital Light Processing (DLP)-based projector, and a laser projector.

Optionally, a given image renderer could be a multi-resolution image renderer, or a single-resolution image renderer. Multi-resolution image renderers are configured to display images at two or more display resolutions, whereas single-resolution image renderers are configured to display images at a single display resolution only. Optionally, the display apparatus comprises one image renderer per eye, wherein each image renderer is a multi-resolution light source. Alternatively, optionally, the display apparatus comprises at least two image renderers per eye, the at least two image renderers comprising at least one first image renderer and at least one second image renderer, wherein the at least one first image renderer is configured to display first output image frames at a first display resolution and the at least one second image renderer is configured to display second output image frames at a second display resolution, the second display resolution being higher than the first display resolution.

Herein, the "display resolution" of the image renderer refers to a total number of pixels in each dimension of the image renderer, or to a pixel density (namely, a number of pixels per unit distance or area) in the image renderer. The image renderer generally comprises a plurality of pixels, wherein the plurality of pixels are arranged in a required manner (for example, such as a rectangular two-dimensional grid). A given pixel of the image renderer comprises a plurality of sub-pixels. A given sub-pixel is a separately addressable single-color picture element. Typically, in image renderers, there is some space between the pixels and/or between the sub-pixels. Light-shifting for displayed output image frames optionally occurs within such a space. The plurality of sub-pixels of the given pixel are arranged in a required sub-pixel scheme (for example, such as a one-dimensional array, a two-dimensional grid, a PenTile® matrix layout, and the like). Optionally, the given pixel comprises 3 sub-pixels. As an example, the given pixel may comprise a red sub-pixel, a green sub-pixel, and a blue sub-pixel. Alternatively, optionally, the given pixel comprises 5 sub-pixels. Optionally, in this regard, the 5 sub-pixels comprise two red sub-pixels, two green sub-pixels, and one blue sub-pixel that are arranged in the PenTile® matrix layout.

Throughout the present disclosure, the term "liquid-crystal device" refers to a device that enables shifting of light passing therethrough using a liquid-crystal medium. The liquid-crystal structure contains the liquid-crystal medium. The control circuit is a specialized circuit that electrically controls the liquid-crystal medium contained within the liquid-crystal structure. The liquid-crystal structure is arranged in front of the image-rendering surface of the image renderer and steers light emanating from the image-rendering surface through itself. In operation, the control circuit applies electrical signals to control the liquid-crystal medium contained within the liquid-crystal structure in a required manner, so as to shift light emanating from the given pixel of the image renderer to the plurality of positions in the sequential and repeated manner. Optionally, the electrical signals applied by the control circuit control an orientation of liquid-crystal molecules of the liquid-crystal medium.

It will be appreciated that the liquid-crystal device is optimized according to the image renderer. For optimum functioning of the display apparatus, the liquid-crystal device is designed according to the display resolution of the image renderer.

Optionally, the light emanating from the given pixel of the image renderer is shifted by a fraction of the given pixel. In other words, the light emanating from the given pixel is shifted by sub-pixel amounts. Optionally, when the liquid-crystal structure is not addressed (namely, is turned off), the light emanating from the given pixel undergoes simple refraction as it passes through the liquid-crystal structure. Resultantly, the light is incident at an initial position (amongst the plurality of positions) on an imaginary plane.

Optionally, the liquid-crystal structure comprises a plurality of layers of the liquid-crystal medium that are individually and selectively addressable, wherein a given layer is to be selectively addressed to direct light received thereat from the given pixel or from a previous layer towards a given direction. Optionally, in this regard, the plurality of layers are collectively addressable to direct the light to the plurality of positions that lie on the imaginary plane extending across two directions in which the light is directed.

Optionally, the display apparatus further comprises a collimator arranged between the image renderer and the liquid-crystal structure. The collimator minimizes spreading of light emanating from each pixel of the image renderer, thereby minimizing blending (or overlap) of light emanating from one pixel of the image renderer with light emanating from another pixel of the image renderer. Moreover, the collimator allows for properly blending light from sub-pixels of a given pixel of the image renderer before the light is incident upon the liquid-crystal structure to be shifted by the liquid-crystal structure. Therefore, the collimator performs both differentiating and collimating functions for the light emanating from the pixels of the image renderer. The collimator may be implemented as a perforated plate, a lenticular array, an array of nanotubes (wherein each nanotube of the array collimates light emanating from a single pixel of the image renderer), a fiber optic plate, or similar.

The processor controls overall operation of the display apparatus. In particular, the processor is coupled to and controls operation of the image renderer and the liquid-crystal device (and specifically, the control circuit of the liquid-crystal device). The processor is also coupled to the pose-tracking means. It will be appreciated that the processor is coupled to various components of the display apparatus and optionally, controls operation of at least some of said components. The at least one processor may be understood to be a compositor (namely, a processing unit that is configured to perform at least compositing tasks pertaining to presentation of the XR environment). The compositor is a software module taking various inputs (such as the pose-tracking data from the pose-tracking means) and composing the output image frames to be displayed on the HMD image renderers.

The at least one processor generates the sequence of output image frames. In an embodiment, the sequence of output image frames is generated by a rendering application that is executed by a rendering server or the computer coupled to the HMD. Alternatively, optionally, the sequence of output image frames is generated by a processor of the HMD, the processor executing the rendering application.

Optionally, the at least one processor employs at least one data processing algorithm to process the pose-tracking data. The pose-tracking data may be in form of images, IMU/TIMU values, motion sensor data values, magnetic field strength values, or similar. Correspondingly, requisite data processing algorithm(s) is/are employed to process the pose-tracking data, to determine the head pose of the user. Examples of the at least one data processing algorithm include a feature detection algorithm, an environment mapping algorithm, a data extrapolation algorithm, and the like.

Optionally, the at least one processor is configured to correct a drift in the head pose of the user. Drift correction is performed in order to enable generation of realistic output image frames in a manner that virtual content (for example, such as virtual objects) is appropriately placed with respect to real-world content, and optionally, undergoes realistic movement/deformation in the XR environment. Optionally, the at least one processor utilizes anchor markers arranged at known positions and known orientations within the real-world environment, to determine a required correction corresponding to the drift in the head pose of the user.

Optionally, the processor is configured to: process the pose-tracking data to determine the rate at which the head pose of the user is changing; and compare the rate with the predefined threshold rate. Optionally, the rate at which the head pose of the user is changing is measured as a velocity and/or an acceleration of the user's head. Pose-tracking data of a current time instant is indicative of a head pose of the user at the current time instant, whereas pose-tracking data of the current time instant as well as at least one previous time instant is indicative of the velocity and the acceleration of the user's head. The velocity and the acceleration of the user's head are used to determine how fast the user's current viewpoint and current view direction of viewing the XR environment are changing (at the current time instant). Optionally, the velocity of the user's head is determined in terms of a positional velocity and/or an angular velocity of the user's head.

The predefined threshold rate may be either system defined, or user defined. The predefined threshold rate may be configurable. Optionally, the predefined threshold rate for the positional velocity of the user's head lies within a range of 0.01 centimeters per second to 10 centimeters per second. More optionally, the predefined threshold rate for the positional velocity of the user's head lies within a range of 0.01 centimeters per second to 5 centimeters per second. Yet more optionally, the predefined threshold rate for the positional velocity of the user's head lies within a range of 0.01 centimeters per second to 1 centimeter per second. As an example, the predefined threshold rate for the positional velocity of the user's head may be from 0.01, 0.05, 0.1, 0.2, 0.3, 0.4, 0.5, 0.6, 0.7, 0.8, 0.9, 1, 1.5, 2, 2.5, 3, 3.5, 4 or 4.5 centimeters per second up to 0.05, 0.1, 0.2, 0.3, 0.4, 0.5, 0.6, 0.7, 0.8, 0.9, 1, 1.5, 2, 2.5, 3, 3.5, 4, 4.5 or 5 centimeters per second.

Optionally, the predefined threshold rate for the angular velocity of the user's head lies within a range of 0.01 degrees per second to 20 degrees per second. More optionally, the predefined threshold rate for the angular velocity of the user's head lies within a range of 0.01 degrees per second to 10 degrees per second. Yet more optionally, the predefined threshold rate for the angular velocity of the user's head lies within a range of 0.01 degrees per second to 5 degrees per second. As an example, the predefined threshold rate for the angular velocity of the user's head may be from 0.01, 0.05, 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9 or 9.5 degrees per second up to 0.05, 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5 or 10 degrees per second.

It will be appreciated that it is detected that the rate at which the head pose of the user is changing is below the predefined threshold rate when the user is clearly concentrating on a certain point in the visual scene, as then change in the head pose is very small. Such concentration of the user on the certain point may be either in form of a smooth pursuit or a reading pattern, and they are easily distinguishable from one another when processing the pose-tracking data.

Throughout the present disclosure, the term "lock mode" refers to an operational mode of the display apparatus, wherein a given head pose of the user is selected for a given session of the operational mode, and output image frames are generated according to that given head pose during the given session. The lock mode is switched on (namely, enabled) when the rate at which the head pose of the user is changing is below the predefined threshold rate. When generating the sequence of output image frames according to the given head pose, no re-projection (namely, time-warping or simply, warping) of any output image frame is required. The given head pose is considered to be almost or completely still during the given session of the lock mode, so compensation for unexpected head movements during the given session is not required as the at least one processor would know exactly which generated pixel in the output image frames would map to which physical pixel of the image renderer. This eases re-projection burden from the at least one processor. Optionally, the lock mode is switched on with hysteresis protection.

It will be appreciated that generating the sequence of output image frames according to the given head pose during the given session of the lock mode also allows for various optimizations, since the at least one processor no longer has to render extra pixels that are required for re-projection of the output image frames as required in case of varying head poses. As an example of such optimization, the at least one processor may increase a resolution in a specific portion of a given output image frame by either outright increasing the resolution, or by tweaking foveation curve parameters in case of it using a kind of foveated transport.

Optionally, the at least one processor is configured to select the given head pose of the user for the given session of the lock mode by employing a low-pass filter to filter out changes in the head pose of the user. The low-pass filter is employed to filter out (namely, smoothen) minor changes in the head pose after said time of detecting. In other words, the minor changes in the head pose are forced to zero. A range of the minor changes in the head pose that are filtered out by the low-pass filter defines an acceptable tolerance range of the low-pass filter, wherein as long as a current head pose lies within the tolerance range, the lock mode stays switched on. Optionally, any head pose that lies within the acceptable tolerance range of the low-pass filter is selected as the given head pose of the user for the given session. Optionally, a head pose at a time of detecting that the rate at which the head pose of the user is changing is below the predefined threshold rate, is selected as the given head pose.

Optionally, the at least one processor is configured to tighten the low-pass filter over a first time period at a beginning of the given session of the lock mode. By the phrase "tighten the low-pass filter", it is meant that the acceptable tolerance range of the low-pass filter is reduced. As the low-pass filter is tightened, the range of the minor changes in the head pose that are filtered out by the low-pass filter is reduced. The low-pass filter is progressively (namely, increasingly) tightened over the first time period until a maximum extent of tightening is achieved. When the low-pass filter is tightened to its maximum extent, no minor changes in the head pose of the user would be filtered out by the low-pass filter and only a single head pose will be passed by the low-pass filter. Optionally, this single head pose is the given head pose that is selected for the given session of the lock mode. Then this given head pose is considered to be static for a remaining duration of the lock mode being switched on.

Optionally, the first time period lies within a range of 0.1 second to 1 second. For example, the first time period may be from 0.1, 0.2, 0.3, 0.4, 0.5, 0.6, 0.7, 0.8 or 0.9 second up to 0.2, 0.3, 0.4, 0.5, 0.6, 0.7, 0.8, 0.9 or 1 second. The first time period may depend on human visual process known in the art. Optionally, the first time period is configurable (namely, tunable). The first time period is selected such that the lock mode of the display apparatus is switched on gradually without the user perceiving said switching. The first time period may be either system defined or user defined.

Optionally, the at least one processor is configured to:
  detect, after the lock mode is switched on, whether or not the rate at which the head pose of the user is changing exceeds the predefined threshold rate; and
  when it is detected, after the lock mode is switched on, that the rate exceeds the predefined threshold rate, switch off the lock mode of the display apparatus.

Optionally, in this regard, the at least one processor is configured to: process pose tracking data obtained after the lock mode is switched on, to determine the rate at which the head pose of the user is changing after the lock mode is switched on; and compare the rate with the predefined threshold rate. It will be appreciated that the detection of whether or not the rate exceeds the predefined threshold rate is performed throughout the given session of the lock mode. When the lock mode of the display apparatus is switched off, the sequence of output image frames are generated according to corresponding head poses of the user as determined from the pose-tracking data.

Optionally, the given head pose of the user is selected for the given session of the lock mode by employing a low-pass filter to filter out changes in the head pose of the user, and wherein the at least one processor is configured to loosen the low-pass filter over a second time period prior to ending the given session of the lock mode. By the phrase "loosen the low-pass filter", it is meant that the acceptable tolerance range of the low-pass filter is increased. As the low-pass filter is loosened, the range of the minor changes in the head pose that are filtered out by the low-pass filter is increased. The low-pass filter is loosened to enable a smooth transition from the lock mode being switched on to the lock mode being switched off, over the second time period.

Optionally, the second time period is shorter than the first time period. Optionally, the second time period lies within a range of 0.1 second to 0.8 second. For example, the second time period may be from 0.1, 0.2, 0.3, 0.4, 0.5, 0.6 or 0.7 second up to 0.2, 0.3, 0.4, 0.5, 0.6, 0.7 or 0.8 second. The second time period may depend on human visual process known in the art. Optionally, the second time period is configurable. The second time period is selected such that the lock mode of the display apparatus is switched off gradually without the user perceiving said switching. Moreover, the second time period is selected such that the user doesn't feel like his/her head got 'stuck'. The second time period may be either system defined or user defined.

When the rate at which the head pose of the user is changing is not below the predefined threshold rate, the rate is equal to or greater than the predefined threshold rate. In such a case, the head pose of the user is changing rapidly, and therefore, the sequence of output image frames is generated according to corresponding head poses of the user as determined from the pose-tracking data. Optionally, when generating the sequence of output image frames according to corresponding head poses of the user, the at least one processor is configured to re-project each output image frame according to a corresponding latest head pose of the user. Upon re-projection, visual content represented in a given output image frame is matched with its corresponding latest head pose of the user. This enables the sequence of output image frames to be head pose-consistent and up-to-date at a time of displaying. Optionally, the reprojection of the given output image frame is performed using at least one projection matrix. Here, the term "projection matrix" refers to a matrix that is indicative of a geometrical relationship between three-dimensional points of an XR region (namely, an XR scene) of the XR environment and two-dimensional pixels of the image renderer.

Optionally, when generating the sequence of output image frames, the at least one processor is configured to perform at least one of: lens distortion correction, colour aberration correction. Such corrections are constant mappings and do not change during a given session of using the display device.

The sequence of output image frames is displayed via the image renderer. Upon displaying, the sequence of output image frames is visible to the user. Herein, the term "output image frame" refers to an image frame that serves as an output to be displayed by the image renderer. Notably, the sequence of output image frames constitutes the visual scene of the XR environment.

The liquid-crystal structure is controlled (via a requisite drive signal) to shift light through itself according to a requisite shifting sequence and number of positions in the plurality of positions. The shift in the light emanating from the given pixel of the image renderer to the plurality of positions causes the resolution of the output image frames to appear higher than the display resolution of the image renderer. Given that the light emanating from the given pixel is shifted to X positions in a sequential and repeated manner, X output image frames (that are displayed via the image renderer) would be shown to the user at their corresponding X positions, X being equal to or greater than 2. The user is unable to discern the shift of the given pixel and perceives a unified view of the X output image frames having a resolution that is higher than the display resolution. In other words, the resolution of the given output image frame appears to be enhanced with respect to the display resolution of the image renderer. As an example, the light emanating from the given pixel of the image renderer may be shifted to four positions in the sequential and repeated manner. This causes the resolution of the output image frames to appear four times higher than the display resolution of the image renderer.

Optionally, when generating the output image frames of said sequence, the at least one processor is configured to generate corresponding pixel values to be displayed by the given pixel of the image renderer, based on a shifting sequence in which the light emanating from the given pixel is to be shifted to the plurality of positions. Optionally, in this regard, a given pixel value of the given pixel in a given output image frame depends on a position to which the given pixel is to be shifted during display of the given output image frame (namely the position at which the given pixel will be made visible to the user). Therefore, the at least one processor is required to know the shifting sequence in which the light emanating from the given pixel is to be shifted to the plurality of positions. In simple terms, the same given pixel of the image renderer is utilized to display Q different 'virtual pixels' in Q consecutive output image frames, based on the shifting sequence in which light emanating from the given pixel is to be shifted to Q positions, Q being equal to or greater than 2. Herein, the "pixel value" to be displayed by the given pixel refers to a color value to be displayed by the given pixel, in case of color images; or to an intensity value to be displayed by the given pixel, in case of grayscale images.

Throughout the present disclosure, the term "shifting sequence" refers to a time-based order in which the light emanating from the given pixel is to be shifted to the plurality of positions. The shifting sequence may be a raster scanning sequence, a random sequence, a Halton sequence (for example, 256 or 1024 first locations of Halton (2, 3)), or similar. It will be appreciated that various shifting sequences may be feasible for shifting the light emanating from the given pixel to the plurality of positions.

As an example, four exemplary shifting sequences S1, S2, S3, and S4 that may be feasible for shifting the light emanating from the given pixel to nine positions P1, P2, P3, P4, P5, P6, P7, P8, and P9 through various time instants T1, T2, T3, T4, T5, T6, T7, T8, and T9 are presented in Table 1. Out of these shifting sequences S1-S4, the shifting sequences S1 and S2 are illustrated in FIGS. 4B and 4C, respectively.

TABLE 1

| Sequence No. | T1 | T2 | T3 | T4 | T5 | T6 | T7 | T8 | T9 |
|---|---|---|---|---|---|---|---|---|---|
| S1 | P1 | P2 | P3 | P4 | P5 | P6 | P7 | P8 | P9 |
| S2 | P1 | P2 | P3 | P6 | P9 | P8 | P7 | P4 | P5 |
| S3 | P1 | P4 | P7 | P8 | P5 | P2 | P3 | P6 | P9 |
| S4 | P5 | P2 | P3 | P6 | P9 | P8 | P7 | P4 | P1 |

For example, pixel values (in R,G,B form) to be displayed by the given pixel of the image renderer, based on the shifting sequence S1 may be in the order: (128,0,0), (128, 0,0), (131,4,4), (139,0,0), (149,42,42), (150,0,42), (139,0,0), (136,10,25), (140,15,15); whereas pixel values to be displayed by the given pixel of the image renderer, based on the shifting sequence S2 may be in the order: (128,0,0), (128, 0,0), (131,4,4), (150,0,42), (140,15,15), (136,10,25), (139, 0,0), (139,0,0), (149,42,42).

Optionally, the at least one processor is configured to selectively switch off shifting of light emanating from pixels of a given region of a given output image frame, by generating pixel values of said pixels without employing the shifting sequence. In such a case, the pixel values of the pixels of the given region are generated as if said pixels are not shifted at all. As an example, the pixel values of the pixels of the given region may be generated by averaging pixel values of their corresponding pixels (of their corresponding input image frames) that cover an area of shifting for the pixels of the given region of the given output image frame.

Optionally, the at least one processor is configured to send a drive signal to the control circuit of the liquid-crystal device, to increase a number of positions, in the plurality of positions, to which the light emanating from the given pixel is to be shifted during the given session of the lock mode. Increasing the number of positions in the plurality of positions during the given session of the lock mode further increases a spatial resolution of the output image frames during the given session. As the given head pose of the user during the given session is constant, reprojection of the output image frames is not required during the given session even upon the increase in the number of positions. If the head pose of the user were varying during the given session, the at least one processor would have had to provide framebuffer data for the output image frames such that said data would cover an entire logical resolution, wherein the logical resolution is equal to Z times the display resolution of the image renderer, and Z is equal to a number of positions in the plurality of positions. In this varying head pose case, there is no 1:1 mapping of generated pixels (in the framebuffer data) to the pixels of the image renderer, and only 100/Z percent of the generated pixels would be used for displaying. However, when the given head pose of the user is locked in the given session of the lock mode, the reprojection of the output image frames is not required during the given session, and therefore, it is possible to achieve 1:1 mapping of the generated pixels to the pixels of the image renderer. By increasing the number of positions in the plurality of positions to Y (which is greater than Z), remaining pixels of the generated pixels can be utilized effectively for increasing the spatial resolution of the output image frames during the given session.

It will be appreciated that when the number of positions in the plurality of positions to which the light emanating from the given pixel is to be shifted during the given session of the lock mode is optionally increased, a repeating period of the shifting sequence increases. In such a case, a physical frame rate of the image renderer remains unchanged, but a logical frame rate will decrease as more output image frames would be displayed for revisiting a same pixel position. In other words, a temporal resolution of the output image frames decreases.

Optionally, the plurality of positions of the given pixel form an N×N array, wherein the number of positions are to be increased by increasing a value of N by at least one for the given session of the lock mode. Optionally, in this regard, N is selected from the group consisting of 2, 3, 4, 5 and 6. Other higher values of N are also feasible. The increased number of positions to which the light emanating from the given pixel is to be shifted lie within a same area of the image renderer as an original number of positions in the N×N array prior to increasing the number of positions. The same area of the image renderer is utilized for shifting the light emanating from the given pixel to N×N positions, as well as to increased N×N positions. In simpler terms, a size of the area corresponding to the array remains the same irrespective of the number of positions to which the given pixel has to be shifted. It will be appreciated that a shape of the area of the image renderer that includes the plurality of positions could be polygonal (for example, rectangular, square, hexagonal, and the like), circular, elliptical, freeform, and the like.

It will be appreciated that the area (of the image renderer) within which light shifting to the plurality of positions takes place depends on a sub-pixel scheme and spacing between the pixels and/or between the sub-pixels. Optionally, the area of the image renderer within which the light emanating from the given pixel is to be shifted lies in-between neighboring pixels of the given pixel.

Optionally, the plurality of positions of the given pixel form an M×N array, wherein the number of positions are to be increased by increasing a value of M and/or N by at least one for the given session of the lock mode. Optionally, in this regard, M and N are selected from the group consisting of 2, 3, 4, 5 and 6. Other higher values of M and/or N are also feasible.

Optionally, the plurality of positions of the given pixel form: a polygonal arrangement, a circular arrangement, an elliptical arrangement, a freeform arrangement. Two exemplary circular arrangements of the plurality of positions are illustrated in FIGS. 3E and 3F.

Optionally, the display apparatus further comprises gaze-tracking means, wherein the at least one processor is configured to:
process gaze-tracking data, collected by the gaze-tracking means, to determine a gaze location and a gaze velocity and/or acceleration of the user;
detect, based on the gaze location and the gaze velocity and/or acceleration of the user, whether or not the user's gaze is in smooth pursuit; and
send the drive signal to the control circuit to increase the number of positions during the given session of the lock mode, when it is detected that the user's gaze is in smooth pursuit.

Herein, the term "gaze-tracking means" refers to a specialized equipment for detecting and/or following gaze of the user, when the HMD in operation is worn by the user. The gaze-tracking means could be implemented as contact lenses with sensors, cameras monitoring a position of a pupil of the user's eye, and the like. Such gaze-tracking means are well-known in the art. It will be appreciated that the gaze-tracking data is collected repeatedly by the gaze-tracking means throughout a given session of using the display apparatus, as gaze of the user's eyes keeps changing whilst he/she uses the display apparatus. An up-to-date gaze-tracking data allows for producing an up-to-date actively foveated XR environment for presenting at the HMD.

Throughout the present disclosure, the term "gaze location" refers to a location in the visual scene that corresponds to a gaze direction of the user. The gaze location can be a point that is identified based on the gaze direction of the user, by processing the gaze-tracking data. Optionally, the gaze location in the visual scene is identified by mapping the gaze direction of the user to a corresponding location in an output image frame. It will be appreciated that gaze-tracking data of a current time instant is indicative of the gaze location at the current time instant, whereas gaze-tracking data of the current time instant as well as at least one previous time instant is indicative of the gaze velocity and/or acceleration of the user. The gaze location and the gaze velocity and/or acceleration are used to detect a manner in which the user's gaze is changing (at the current time instant) so as to detect whether or not the user's gaze is in smooth pursuit. The user's gaze is in smooth pursuit when the user's gaze smoothly pursues a moving object or reading text in the visual scene. When it is detected that the user's gaze is in smooth pursuit, the number of positions during the given session of the lock mode can optionally be increased to increase a spatial resolution of the visual scene during the lock mode without compromising on a quality of the visual scene. In the lock mode, as the given pose of the user is selected and considered to be static, the at least one processor is able to generate pixel-accurate data for the sequence of output image frames even for the increased number of positions, since reprojection is not required for such output image frames.

Optionally, when generating a given output image frame, the at least one processor is configured to:
determine a first region and a second region within the given output image frame, the second region surrounding the first region; and
generate pixel values for the first region and the second region in a manner that an angular resolution of the first region is higher than an angular resolution of the second region.

Optionally, the at least one processor is configured to process a sequence of input image frames to generate the sequence of output image frames. Throughout the present disclosure, the term "input image frame" refers to an image frame that serves as an input for generating a corresponding output image frame. The sequence of input image frames is not shown to the user, whereas the sequence of output image frames is shown to the user.

In an embodiment, the at least one processor is configured to: process the gaze-tracking data, collected by the gaze-tracking means, to determine a gaze direction of the user; and determine the first region within the given output image frame based on the gaze direction of the user. The first region is a region of the given output image frame that corresponds to the gaze direction of the user and includes the gaze location. In other words, the first region is a region of interest within the given output image frame, towards which the gaze of the user is directed (namely, focused) when the user views the visual scene. The second region is a remaining region of the given output image frame that surrounds the first region. Optionally, the gaze location corresponds to a centre of the first region.

In another embodiment, the first region corresponds to a central region of the given output image frame; and the second region surrounds the first region. In this regard, locations of the first region and the second region in the given output image frame are determined to be fixed.

Throughout the present disclosure, the term "angular resolution" of a given region of a given image frame refers to a number of pixels per degree (also referred to as points per degree (PPD)) in the given region. In other words, angular resolution of the given region of the given image frame refers to a pixel density in the given region. Notably, a high angular resolution of the given region is indicative of a high visual detail of the given region. The given output image frame optionally has a variable angular resolution as the angular resolution of the first region is higher than the angular resolution of the second region. The variable angular resolution of the sequence of output image frames emulates and approximates human-eye resolution and human-eye foveation properties, without requiring use of expensive high-resolution image renderers and additional optical components. The angular resolution of the first region optionally approximates super-resolution, the super-resolution being provided only in the first region as foveas of the user's eyes are quite insensitive to flicker that is introduced upon provision of the super-resolution. In the second region, the super-resolution is not provided since remaining portions of the retinas of the user's eyes are quite sensitive to flicker.

Optionally, the pixel values for the first region and the second region are generated in a manner that:

a same pixel value of a given pixel in a first region of a given input image frame is associated with a corresponding pixel in the first region of the corresponding output image frame, and pixel values of a group of pixels in a second region of the given input image frame are combined to obtain a pixel value of a given pixel in the second region of the corresponding output image frame.

Optionally, when processing the sequence of input image frames to generate the pixel values for the second region, the at least one processor is configured to employ at least one of: pixel binning, weighted averaging, non-linear median filtering, minimum-maximum filtering, interpolation, image scaling (namely, image resizing).

Optionally, when processing the sequence of input image frames, the at least one processor is configured to generate from a first region of each Lth input image frame first regions of L successive output image frames. As a result, an apparent frame rate of the first regions of output image frames reduces to 1/L. When the user views the L successive output image frames, the user is unable to perceive shifting in light emanating from pixels of the image renderer, and instead perceives an extremely high angular resolution (commonly referred to as super-resolution) of the first regions of the L successive output image frames. In other words, there occurs spatial resolution up-conversion by temporal resolution down-sampling.

Optionally, the sequence of output image frames is displayed in a manner that second regions of the output image frames appear to have a higher frame rate than first regions of the output image frames. In other words, a temporal resolution of the second regions is higher than a temporal resolution of the first regions of the output image frames. The apparent frame rate (namely, the temporal resolution) of the second regions of the output image frames is high (for example, such as 90 frames per second (FPS), 100 FPS, 120 FPS, 180 FPS, 240 FPS, and the like). Resultantly, no flicker or jerk is noticed by the user in the second regions of the output image frames. Moreover, when the sequence of output image frames is displayed, the user perceives higher visual detail in the first regions of the output image frames as compared to the second regions of the output image frames.

Optionally, in the method, the step of generating the output image frames of said sequence comprises generating corresponding pixel values to be displayed by the given pixel of the image renderer, based on a shifting sequence in which the light emanating from the given pixel is to be shifted to the plurality of positions.

Optionally, the method further comprising sending a drive signal to the control circuit of the liquid-crystal device, to increase a number of positions, in the plurality of positions, to which the light emanating from the given pixel is to be shifted during the given session of the lock mode.

Optionally, in the method, the plurality of positions of the given pixel form an N×N array, wherein the number of positions are increased by increasing a value of N by at least one for the given session of the lock mode.

Optionally, the display apparatus further comprises gaze-tracking means, the method further comprising:
processing gaze-tracking data, collected by the gaze-tracking means, to determine a gaze location and a gaze velocity and/or acceleration of the user;
detecting, based on the gaze location and the gaze velocity and/or acceleration of the user, whether or not the users gaze is in smooth pursuit; and
sending the drive signal to the control circuit to increase the number of positions during the given session of the lock mode, when it is detected that the user's gaze is in smooth pursuit.

Optionally, in the method, the step of selecting the given head pose of the user for the given session of the lock mode is performed by employing a low-pass filter to filter out changes in the head pose of the user.

Optionally, the method further comprises tightening the low-pass filter over a first time period at a beginning of the given session of the lock mode.

Optionally, the method further comprises:
detecting, after the lock mode is switched on, whether or not the rate at which the head pose of the user is changing exceeds the predefined threshold rate; and
when it is detected, after the lock mode is switched on, that the rate exceeds the predefined threshold rate, switching off the lock mode of the display apparatus.

Optionally, in the method, the given head pose of the user is selected for the given session of the lock mode by employing a low-pass filter to filter out changes in the head pose of the user, the method further comprising loosening the low-pass filter over a second time period prior to ending the given session of the lock mode.

Optionally, in the method, the step of generating a given output image frame comprises:
determining a first region and a second region within the given output image frame, the second region surrounding the first region; and
generating pixel values for the first region and the second region in a manner that an angular resolution of the first region is higher than an angular resolution of the second region.

DETAILED DESCRIPTION OF THE DRAWINGS

Referring to FIG. 1, illustrated is a block diagram of architecture of a display apparatus 100, in accordance with an embodiment of the present disclosure. The display apparatus 100 comprises pose-tracking means 102, an image renderer per eye (depicted as an image renderer 104 for a first eye and an image renderer 106 for a second eye), a liquid-crystal device per eye (depicted as a liquid-crystal device 108 for the first eye and a liquid-crystal device 110 for the second eye), and at least one processor (depicted as a processor 112). The liquid crystal devices 108 and 110 comprise liquid-crystal structures 114 and 116 and control circuits 118 and 120, respectively. The liquid-crystal structures 114 and 116 are arranged in front of image-rendering surfaces of the image renderers 104 and 106, respectively.

Figure 2:
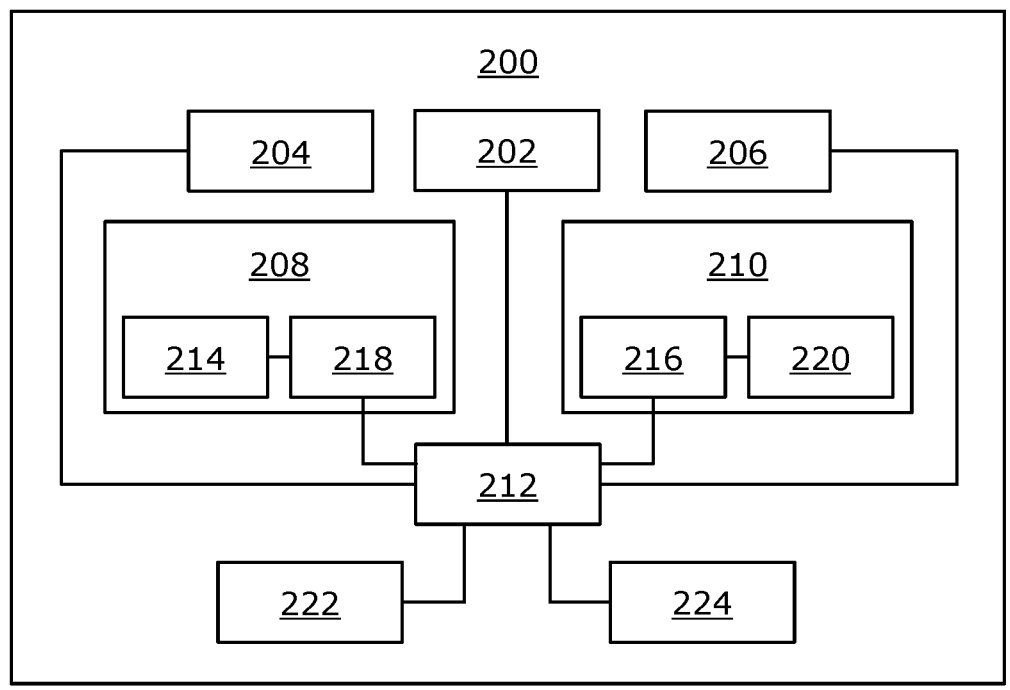

Referring to FIG. 2, illustrated is a block diagram of architecture of a display apparatus 200, in accordance with another embodiment of the present disclosure. The display apparatus 200 comprises pose-tracking means 202, an image renderer per eye (depicted as an image renderer 204 for a first eye and an image renderer 206 for a second eye), a liquid-crystal device per eye (depicted as a liquid-crystal device 208 for the first eye and a liquid-crystal device 210 for the second eye), and at least one processor (depicted as a processor 212). The liquid crystal devices 208 and 210 comprise liquid-crystal structures 214 and 216 and control circuits 218 and 220, respectively. The liquid-crystal structures 214 and 216 are arranged in front of image-rendering surfaces of the image renderers 204 and 206, respectively.

The display apparatus 200 further comprises gaze-tracking means 222 and a low-pass filter 224. The processor 212 is coupled to the gaze-tracking means 222 and the low-pass filter 224.

It may be understood by a person skilled in the art that the FIGS. 1 and 2 include simplified architectures of different display apparatuses 100 and 200 for sake of clarity, which should not unduly limit the scope of the claims herein. The person skilled in the art will recognize many variations, alternatives, and modifications of embodiments of the present disclosure.

Referring to FIGS. 3A, 3B, 3C, 3D, 3E and 3F, illustrated are various positions to which light emanating from a given pixel of an image renderer are shifted in a sequential and repeated manner, in accordance with various embodiments of the present disclosure. In FIGS. 3A-3F, these positions are represented as blackened circles, and a square outline is depicted merely to show an area where the shifting takes place. Such an area can also have any other suitable shape.

Figure 3A:
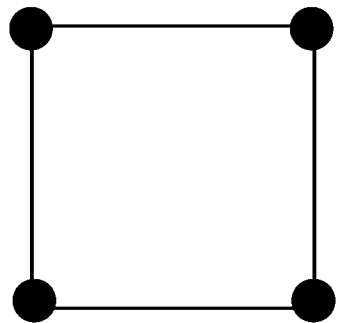
FIGS. 3A, 3B, 3C, 3D, 3E and 3F illustrate various positions to which light emanating from a given pixel of an image renderer is shifted in a sequential and repeated manner, in accordance with various embodiments of the present disclosure.
Figure 3B:
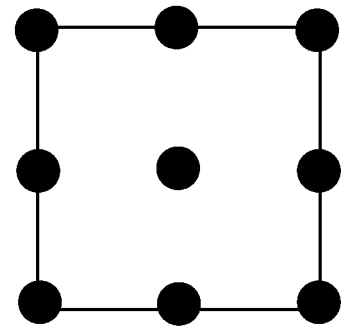
Figure 3C:
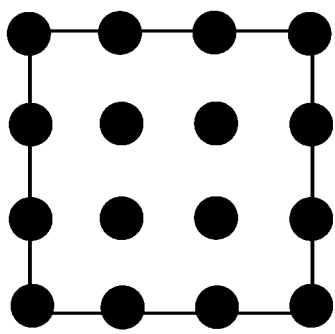
Figure 3D:
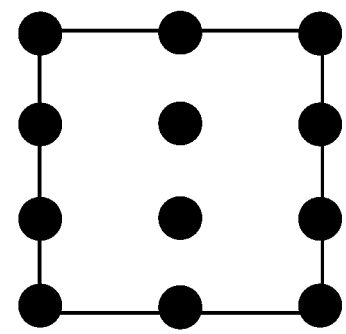
Figure 3E:
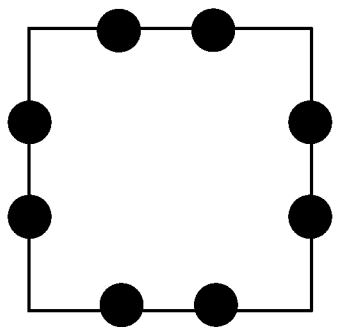
Figure 3F:
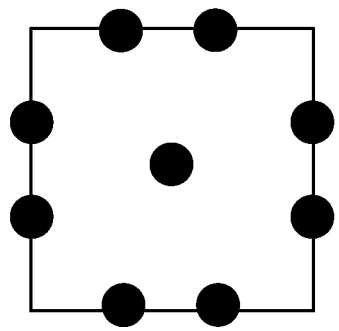

In FIG. 3A, the light emanating from the given pixel is shifted to four positions. These four positions form a 2×2 array. In FIG. 3B, the light emanating from the given pixel is shifted to nine positions. These nine positions form a 3×3 array. In FIG. 3C, the light emanating from the given pixel is shifted to 16 positions. These 16 positions form a 4×4 array. In FIG. 3D, the light emanating from the given pixel is shifted to 12 positions. These 12 positions form a 4×3 array. In FIG. 3E, the light emanating from the given pixel is shifted to 8 positions. These 8 positions form a centre-less circular arrangement. In FIG. 3F, the light emanating from the given pixel is shifted to 9 positions. These 9 positions form a centred circular arrangement.

It may be understood by a person skilled in the art that the FIGS. 3A-3F include exemplary positions to which light-shifting takes place for sake of clarity, which should not unduly limit the scope of the claims herein. The person skilled in the art will recognize many variations, alternatives, and modifications of embodiments of the present disclosure.

Figure 4A:
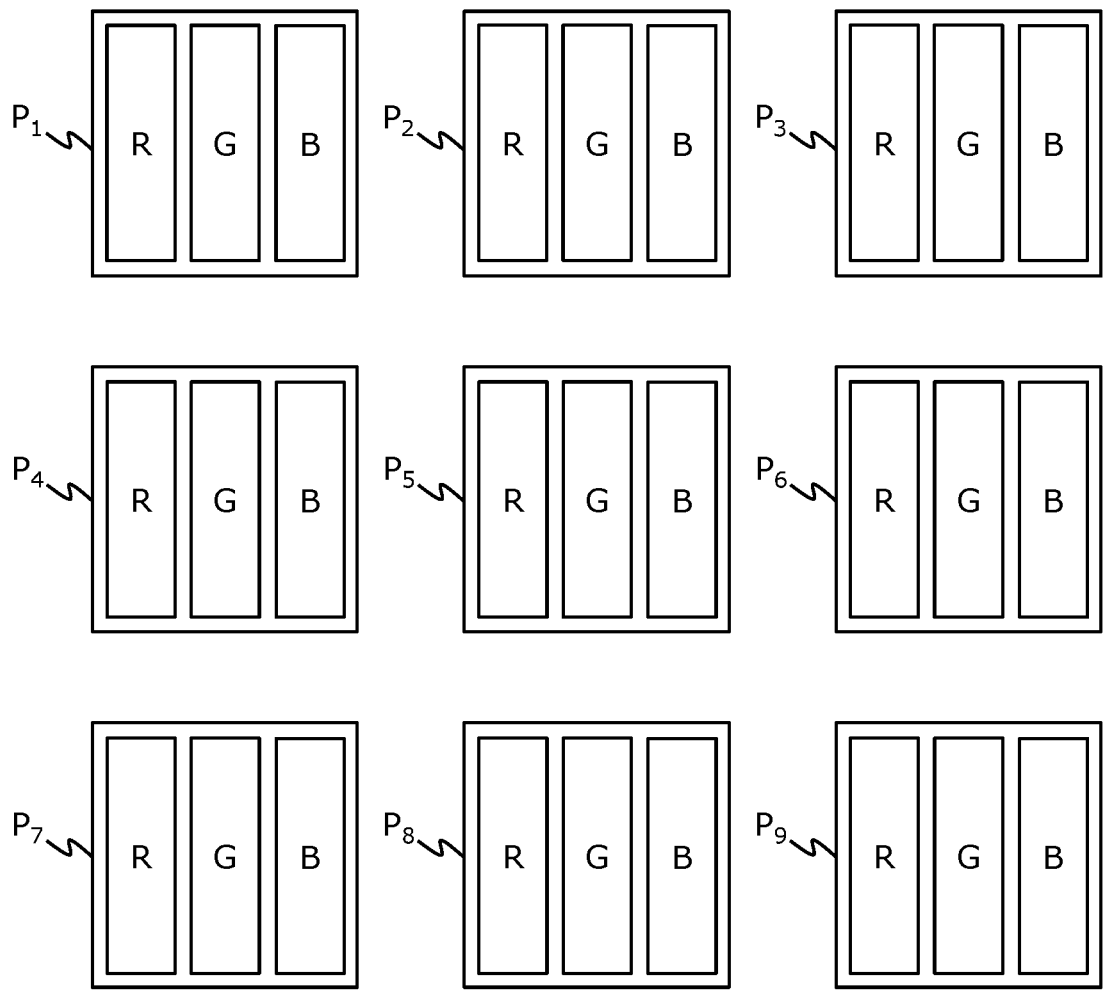
FIG. 4A illustrates nine positions to which light emanating from a given pixel of an image renderer is shifted in a sequential and repeated manner, in accordance with an embodiment of the present disclosure.
Figure 4B:
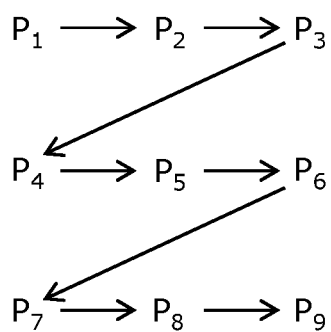
FIGS. 4B and 4C illustrate two exemplary shifting sequences in which the light emanating from the given pixel is to be shifted to the nine positions of FIG. 4A, in accordance with different embodiments of the present disclosure.
Figure 4C:
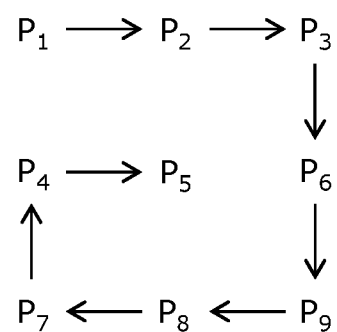

Referring to FIG. 4A, illustrated are nine positions P1, P2, P3, P4, P5, P6, P7, P8, and P9 to which light emanating from a given pixel of an image renderer is shifted in a sequential and repeated manner, in accordance with an embodiment of the present disclosure. The positions P1, P2, P3, P4, P5, P6, P7, P8, and P9 form a 3×3 array. The given pixel includes 3 sub-pixels (notably, a red sub-pixel depicted as 'R', a green sub-pixel depicted as 'G', and a blue sub-pixel depicted as 'B').

Referring to FIGS. 4B and 4C, illustrated are two exemplary shifting sequences in which the light emanating from the given pixel is to be shifted to the nine positions P1, P2, P3, P4, P5, P6, P7, P8, and P9 of FIG. 4A, in accordance with different embodiments of the present disclosure. An order in which the positions are to be shifted sequentially is indicated by way of arrows. In FIG. 4B, the shifting sequence is: P1, P2, P3, P4, P5, P6, P7, P8, P9. In FIG. 4C, the shifting sequence is: P1, P2, P3, P6, P9, P8, P7, P4, P5.

Figure 5:
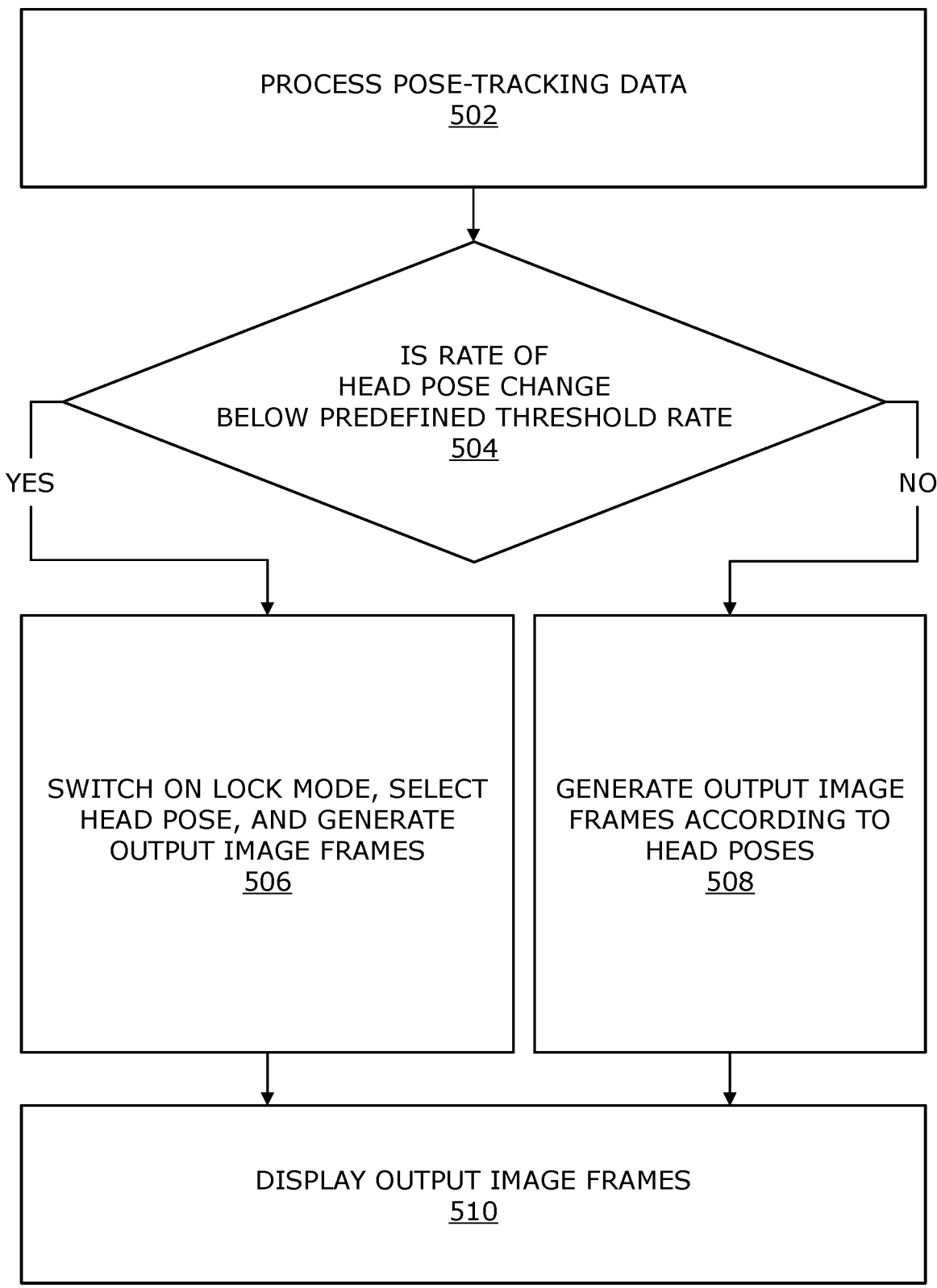
FIG. 5 illustrates steps of a method of displaying via a display apparatus, in accordance with an embodiment of the present disclosure.

Referring to FIG. 5 illustrated are steps of a method of displaying via a display apparatus, in accordance with an embodiment of the present disclosure. The display apparatus comprises pose-tracking means, an image renderer per eye, and a liquid-crystal device comprising a liquid-crystal structure and a control circuit, wherein the liquid-crystal structure is arranged in front of an image-rendering surface of the image renderer. At step 502, pose-tracking data, collected by the pose-tracking means, is processed to determine a head pose of a user. At step 504, it is detected whether or not a rate at which the head pose of the user is changing is below a predefined threshold rate. When it is detected that the rate is below the predefined threshold rate, at step 506, a lock mode of the display apparatus is switched on, a given head pose of the user is selected for a given session of the lock mode, and a sequence of output image frames is generated according to the given head pose during the given session of the lock mode. Otherwise, when it is detected that the rate is not below the predefined threshold rate, at step 508, the sequence of output image frames is generated according to corresponding head poses of the user as determined from the pose-tracking data. At step 510, the sequence of output image frames is displayed via the image renderer, whilst controlling the liquid-crystal structure, via the control circuit, to shift light emanating from a given pixel of the image renderer to a plurality of positions in a sequential and repeated manner. A shift in the light emanating from the given pixel of the image renderer to the plurality of positions causes a resolution of the output image frames to appear higher than a display resolution of the image renderer.

The steps 502, 504, 506, 508, and 510 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
  pose-tracking means;
  an image renderer per eye;
  a liquid-crystal device comprising a liquid-crystal structure and a control circuit, wherein the liquid-crystal structure is arranged in front of an image-rendering surface of the image renderer; and
  at least one processor configured to:
    process pose-tracking data, collected by the pose-tracking means, to determine a head pose of a user;
    detect whether or not a rate at which the head pose of the user is changing is below a predefined threshold rate;
    when it is detected that the rate is below the predefined threshold rate, switch on a lock mode of the display apparatus, select a given head pose of the user for a given session of the lock mode, and generate a sequence of output image frames according to the given head pose during the given session of the lock mode;
    when it is detected that the rate is not below the predefined threshold rate, generate the sequence of output image frames according to corresponding head poses of the user as determined from the pose-tracking data; and
    display the sequence of output image frames via the image renderer, whilst controlling the liquid-crystal structure, via the control circuit, to shift light emanating from a given pixel of the image renderer to a plurality of positions in a sequential and repeated manner, wherein a shift in the light emanating from the given pixel of the image renderer to the plurality of positions causes a resolution of the output image frames to appear higher than a display resolution of the image renderer;

wherein the at least one processor is further configured to:
detect, after the lock mode is switched on, whether or not the rate at which the head pose of the user is changing exceeds the predefined threshold rate; and
when it is detected, after the lock mode is switched on, that the rate exceeds the predefined threshold rate, switch off the lock mode of the display apparatus;
wherein the given head pose of the user is selected for the given session of the lock mode by employing a low-pass filter to filter out changes in the head pose of the user, and wherein the at least one processor is configured to loosen the low-pass filter over a second time period prior to ending the given session of the lock mode.

2. The display apparatus of claim 1, wherein, when generating the output image frames of said sequence, the at least one processor is configured to generate corresponding pixel values to be displayed by the given pixel of the image renderer, based on a shifting sequence in which the light emanating from the given pixel is to be shifted to the plurality of positions.

3. The display apparatus of claim 1, wherein the at least one processor is configured to send a drive signal to the control circuit of the liquid-crystal device, to increase a number of positions, in the plurality of positions, to which the light emanating from the given pixel is to be shifted during the given session of the lock mode.

4. The display apparatus of claim 3, wherein the plurality of positions of the given pixel form an N×N array, wherein the number of positions are to be increased by increasing a value of N by at least one for the given session of the lock mode.

5. The display apparatus of claim 3, further comprising gaze-tracking means, wherein the at least one processor is configured to:
process gaze-tracking data, collected by the gaze-tracking means, to determine a gaze location and a gaze velocity and/or acceleration of the user;
detect, based on the gaze location and the gaze velocity and/or acceleration of the user, whether or not the user's gaze is in smooth pursuit; and
send the drive signal to the control circuit to increase the number of positions during the given session of the lock mode, when it is detected that the user's gaze is in smooth pursuit.

6. The display apparatus of claim 1, wherein the at least one processor is configured to select the given head pose of the user for the given session of the lock mode by employing a low-pass filter to filter out changes in the head pose of the user.

7. The display apparatus of claim 6, wherein the at least one processor is configured to tighten the low-pass filter over a first time period at a beginning of the given session of the lock mode.

8. The display apparatus of claim 1, wherein, when generating a given output image frame, the at least one processor is configured to:
determine a first region and a second region within the given output image frame, the second region surrounding the first region; and
generate pixel values for the first region and the second region in a manner that an angular resolution of the first region is higher than an angular resolution of the second region.

9. A method of displaying via a display apparatus comprising pose-tracking means, an image renderer per eye, and a liquid-crystal device comprising a liquid-crystal structure and a control circuit, wherein the liquid-crystal structure is arranged in front of an image-rendering surface of the image renderer, the method comprising:
processing pose-tracking data, collected by the pose-tracking means, to determine a head pose of a user;
detecting whether or not a rate at which the head pose of the user is changing is below a predefined threshold rate;
when it is detected that the rate is below the predefined threshold rate, switching on a lock mode of the display apparatus, selecting a given head pose of the user for a given session of the lock mode, and generating a sequence of output image frames according to the given head pose during the given session of the lock mode;
when it is detected that the rate is not below the predefined threshold rate, generating the sequence of output image frames according to corresponding head poses of the user as determined from the pose-tracking data; and
displaying the sequence of output image frames via the image renderer, whilst controlling the liquid-crystal structure, via the control circuit, to shift light emanating from a given pixel of the image renderer to a plurality of positions in a sequential and repeated manner, wherein a shift in the light emanating from the given pixel of the image renderer to the plurality of positions causes a resolution of the output image frames to appear higher than a display resolution of the image renderer;
detecting, after the lock mode is switched on, whether or not the rate at which the head pose of the user is changing exceeds the predefined threshold rate; and
when it is detected, after the lock mode is switched on, that the rate exceeds the predefined threshold rate, switching off the lock mode of the display apparatus,
wherein the given head pose of the user is selected for the given session of the lock mode by employing a low-pass filter to filter out changes in the head pose of the user, the method further comprising loosening the low-pass filter over a second time period prior to ending the given session of the lock mode.

10. The method of claim 9, wherein the step of generating the output image frames of said sequence comprises generating corresponding pixel values to be displayed by the given pixel of the image renderer, based on a shifting sequence in which the light emanating from the given pixel is to be shifted to the plurality of positions.

11. The method of claim 9, further comprising sending a drive signal to the control circuit of the liquid-crystal device, to increase a number of positions, in the plurality of positions, to which the light emanating from the given pixel is to be shifted during the given session of the lock mode.

12. The method of claim 11, wherein the plurality of positions of the given pixel form an N×N array, wherein the number of positions are increased by increasing a value of N by at least one for the given session of the lock mode.

13. The method of claim 11, wherein the display apparatus further comprises gaze-tracking means, the method further comprising:
- processing gaze-tracking data, collected by the gaze-tracking means, to determine a gaze location and a gaze velocity and/or acceleration of the user;
- detecting, based on the gaze location and the gaze velocity and/or acceleration of the user, whether or not the user's gaze is in smooth pursuit; and
- sending the drive signal to the control circuit to increase the number of positions during the given session of the lock mode, when it is detected that the user's gaze is in smooth pursuit.

14. The method of claim 9, wherein the step of selecting the given head pose of the user for the given session of the lock mode is performed by employing a low-pass filter to filter out changes in the head pose of the user.

15. The method of claim 14, further comprising tightening the low-pass filter over a first time period at a beginning of the given session of the lock mode.

16. The method of claim 9, wherein the step of generating a given output image frame comprises:
- determining a first region and a second region within the given output image frame, the second region surrounding the first region; and
- generating pixel values for the first region and the second region in a manner that an angular resolution of the first region is higher than an angular resolution of the second region.

* * * * *